(12) United States Patent
Oikawa et al.

(10) Patent No.: US 7,127,598 B2
(45) Date of Patent: Oct. 24, 2006

(54) SEMICONDUCTOR DEVICE COMPRISING TRANSITION DETECTING CIRCUIT AND METHOD OF ACTIVATING THE SAME

(75) Inventors: Kohei Oikawa, Kamakura (JP);
Shinichiro Shiratake, Yokohama (JP);
Yoshiaki Takeuchi, Yokohama (JP);
Daisaburo Takashima, Yokohama (JP);
Thomas Roehr, Yokohama (JP)

(73) Assignees: Kabushiki Kaisha Toshiba, Tokyo (JP); Infineon Technologies, AG, Munich (DE)

( * ) Notice: Subject to any disclaimer, the term of this patent is extended or adjusted under 35 U.S.C. 154(b) by 560 days.

(21) Appl. No.: 10/322,587

(22) Filed: Dec. 19, 2002

(65) Prior Publication Data

US 2004/0123085 A1 Jun. 24, 2004

(51) Int. Cl.
*G06F 15/177* (2006.01)
(52) U.S. Cl. ............................. 713/1; 327/143; 327/142
(58) Field of Classification Search .................... 713/1; 327/143, 142
See application file for complete search history.

(56) References Cited

U.S. PATENT DOCUMENTS 5,604,701 A * 2/1997 Alexander et al. ..... 365/189.02
5,898,635 A * 4/1999 Raad et al. .................. 365/226
5,912,571 A * 6/1999 Li et al. ...................... 327/143
6,181,637 B1 * 1/2001 Nishimura et al. .... 365/230.06
6,201,751 B1 * 3/2001 Thomann ..................... 365/226

FOREIGN PATENT DOCUMENTS

| CN | 1206198 A | 1/1999 |
| EP | 0 887 801 A2 | 12/1998 |
| JP | 8-63264 | 3/1996 |
| JP | 10-111742 | 4/1998 |
| JP | 11-134868 | 5/1999 |
| JP | 11-136109 | 5/1999 |

* cited by examiner

*Primary Examiner*—Thomas Lee
*Assistant Examiner*—Vincent Tran
(74) *Attorney, Agent, or Firm*—Oblon, Spivak, McClelland, Maier & Neustadt, P.C.

(57) ABSTRACT

A semiconductor device includes an internal power supply, at least one semiconductor circuit block, a delay circuit, and a detecting circuit. The internal power supply outputs an initialization completion signal when initialized. The semiconductor circuit block operates on the basis of a voltage generated by the internal power supply. The delay circuit delays the initialization completion signal. The detecting circuit commands the semiconductor circuit block to start operations in response to the initialization completion signal delayed by the delay circuit and an externally input first input signal.

10 Claims, 11 Drawing Sheets

SEMICONDUCTOR DEVICE COMPRISING TRANSITION DETECTING CIRCUIT AND METHOD OF ACTIVATING THE SAME

BACKGROUND OF THE INVENTION

1. Field of the Invention

The present invention relates to a semiconductor device comprising a transition detecting circuit and a method of activating this semiconductor device, and in particular, to an operation of reading data from a semiconductor memory device immediately after power-on.

2. Description of the Related Art

With conventional semiconductor storage devices, a chip enable signal and an address signal are input to the device before power-on. Such a conventional semiconductor storage device will be described with reference to FIG. 1. FIG. 1 is a block diagram of a conventional LSI.

As shown in the figure, an LSI 100 comprises a semiconductor storage device 200 and a transition detecting circuit 300. A power-on reset signal POR is output by an internal power supply in the LSI. The signal POR is output to the semiconductor storage device 200 and the transition detecting circuit 300 when the internal power supply (not shown) is completely initialized. Upon receiving the power-on reset signal POR, the semiconductor storage device 200 and the transition detecting circuit 300 are returned from initialization and become active. The transition detecting circuit 300 detects transitions in a chip enable signal CE and an address signal add which are externally input. Upon detecting a transition in at least one of these signals, the transition detecting circuit 300 outputs a transition detection signal TDS to the semiconductor storage device 200. Upon receiving the transition detection signal TDS, the semiconductor storage device 200 is enabled. Then, the semiconductor storage device 200 starts to operate and reads data from the semiconductor storage device 200.

However, with the configuration shown in FIG. 1, it is difficult to perform a read operation immediately after power-on. This will be described with reference to FIG. 2. FIG. 2 is a timing chart for various signals in the semiconductor device shown in FIG. 1, showing a state observed immediately after power-on.

It is assumed that the semiconductor device 100 is powered on at a time t0 as shown in the figure. Further, as described at the beginning of this section, it is assumed that a chip enable signal and an address signal are input to the semiconductor device 100 before power-on. Then, at a time t1, when the internal power supply is completely initialized, the power-on reset signal POR is enabled. Subsequently, data should be read from the semiconductor storage device 200 according to the input address signal add. However, with the conventional configuration, after the semiconductor storage device 100 has been powered on, no transitions occur in the chip enable signal or the address signal. Accordingly, the transition detecting circuit does not output a transition detection signal TDS. Thus, the semiconductor storage device 200 cannot start operations. As a result, data cannot be read from the semiconductor storage device 200.

For example, Jpn. Pat. Appln. KOKAI Publication No. 2000-339969 describes the above problems and means for solving them. With the method described in this document, while the power-on reset signal is at a specified level or higher, an enable pulse ENP is output whether or not there is a transition in the address signal. This enables a read operation to be performed immediately after power-on.

However, it may be very difficult for the method described in the above document to control the semiconductor device. That is, the enable pulse ENP rises when the voltage of the power-on reset signal reaches the specified level and then falls when the voltage decreases below the specified level. A plurality of circuit blocks included in the semiconductor device is normally returned from initialization when the power-on reset signal rises. However, it is impossible to externally determine the timing with which the power-on reset signal rises and a period for which this signal is at the specified level or higher. Consequently, it is very difficult for the circuit blocks to be returned from initialization concurrently with the power-on reset signal. In particular, the power-on reset signal often remains at the specified level or higher for only a very short time. In this case, an enable pulse may be generated before the other circuit blocks are completely returned from initialization. Then, naturally, the read operation fails. This is a serious problem particularly with semiconductor storage devices that perform destructive read operations.

BRIEF SUMMARY OF THE INVENTION

A semiconductor device according to an aspect of the present invention comprises: an internal power supply which outputs an initialization completion signal when the power supply is initialized; at least one semiconductor circuit block which operates on the basis of a voltage generated by the internal power supply; a delay circuit which delays the initialization completion signal; and a detecting circuit which commands the semiconductor circuit block to start operations in response to the initialization completion signal delayed by the delay circuit and an externally input first input signal, wherein the detecting circuit comprises a logic circuit which performs a logical operation on the first input signal and the initialization completion signal delayed by the delay circuit, and a control circuit which commands the semiconductor circuit block to start operations upon detecting a transition in at least one of the result of the logical operation performed by the logic circuit and an externally input second input signal.

A method of activating a semiconductor device according to an aspect of the present invention comprises: externally inputting first and second input signals to the semiconductor device; turning an internal power supply on; allowing, when the internal power supply is completely initialized, the internal power supply to output a third input signal to a semiconductor circuit block and a control circuit to make the semiconductor circuit block and the control circuit active, and inputting the third input signal to a delay circuit; performing a logical operation on the first input signal and the third input signal delayed by the delay circuit; and allowing the control circuit to command the semiconductor circuit block to start operations upon detecting a transition in at least one of the result of the logical calculation and the second input signal, wherein after receiving the input third input signal, the semiconductor circuit block starts operation when commanded by the control circuit to start operations.

DETAILED DESCRIPTION OF THE INVENTION

Figure 3:
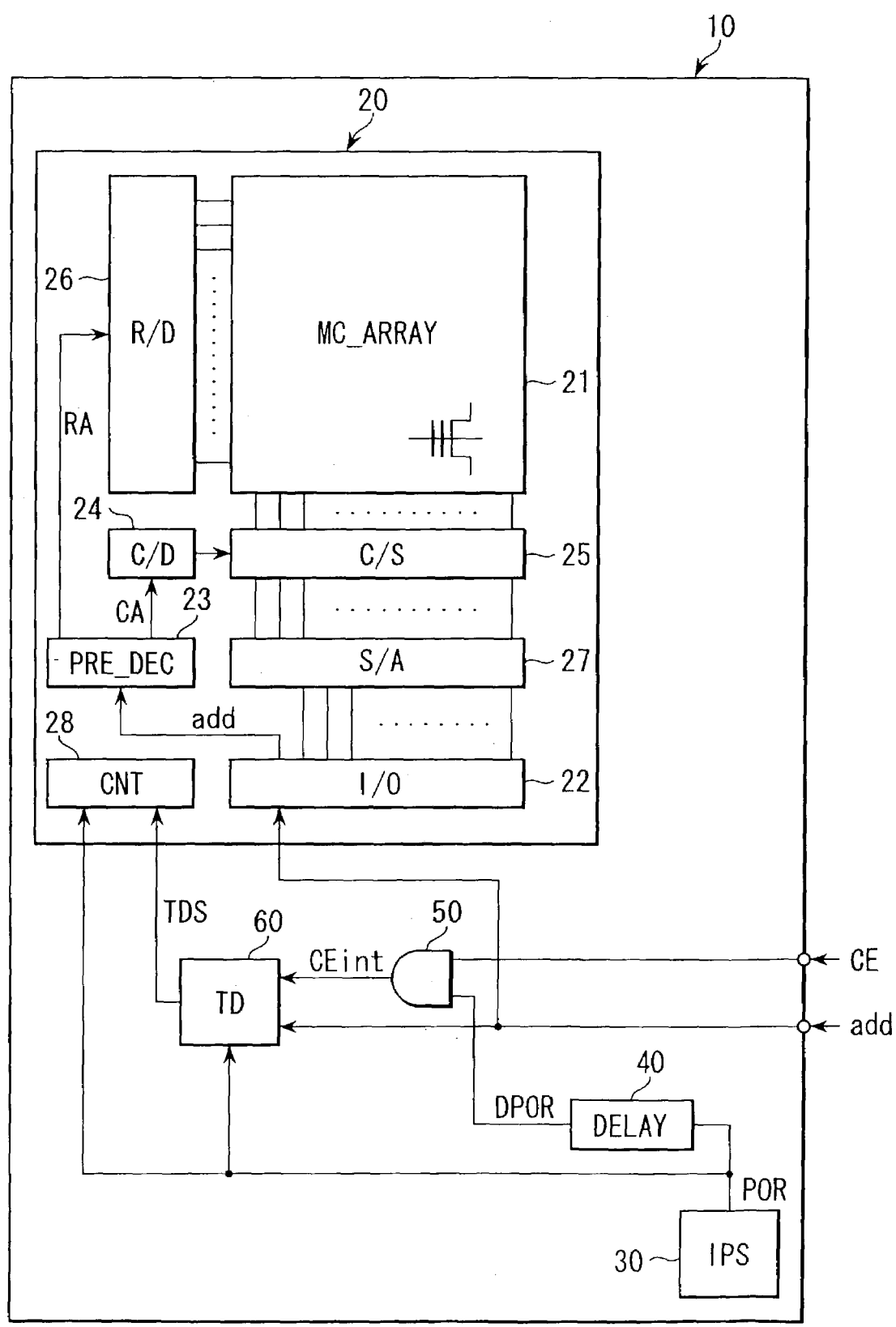
FIG. 3 is a block diagram of a semiconductor device according to a first embodiment of the present invention.

With reference to FIG. 3, a description will be given of a semiconductor device according to a first embodiment of the present invention and a method of activating this semiconductor device. FIG. 3 is a block diagram showing an example of a configuration of a system LSI including a semiconductor storage device.

As shown in the figure, an LSI 10 comprises a semiconductor storage device 20, an internal power supply 30, a delay circuit 40, a logic circuit 50, and a transition detecting circuit 60.

The semiconductor storage device 20 has a memory cell array 21, an I/O circuit 22, a predecoder 23, a column decoder 24, a column selector 25, a row decoder 26, a sense amplifier 27, and a control circuit 28. The memory cell array 21 includes a plurality of memory cells arranged in a matrix. The memory cell is, for example, a flash cell including a control gate and a floating gate. The I/O circuit 22 allows the semiconductor device 20 to transmit and receive signals to and from external equipment. The predecoder 23 decodes an address signal add input by the I/O circuit to obtain a column address signal CA and a row address signal RA. The column decoder 24 obtains a column select signal on the basis of the column address signal CA obtained by the predecoder 23. The column selector 25 selects a bit line from the memory cell array 21 on the basis of the column select signal. The row decoder 26 selects a word line from the memory cell array 21 on the basis of the row address signal RA obtained by the predecoder 23. The control circuit 28 controls operations of each block included in the semiconductor storage device 20. In the semiconductor storage device configured as described above, for a write, data input to the I/O circuit 22 is written to the memory cell selected by the column decoder 24 and the row decoder 26. On the other hand, for a read, a sense amplifier 37 amplifies data read from the memory cell selected by the column decoder 24 and the row decoder 26. The amplified read data is output by the I/O circuit 22.

The internal power supply 30 generates an internal voltage on the basis of an externally provided voltage. Circuits included in the semiconductor device 10 such as the semiconductor storage device 20 and a transition detecting circuit 60 operate using this internal voltage as a power voltage. Further, the internal power supply is initialized immediately after being provided with an external voltage. After the initialization has been completed, the internal power supply becomes active, i.e. it can stably supply internal power. Once the initialization is completed, the internal power supply outputs a power-on reset signal POR. The power-on reset signal POR is provided to the control circuit 28 of the semiconductor storage device 20 and to the transition detecting circuit 60. Upon receiving the input power-on reset signal POR, the semiconductor storage device 20 and the transition detecting circuit 60 are returned from initialization. Returning from initialization means that the circuit block becomes active. Further, the power-on reset signal is supplied to a logic circuit 50 through a wire different from the one through which it is supplied to the semiconductor storage device 20 and the transition detecting circuit 60.

Figure 1:
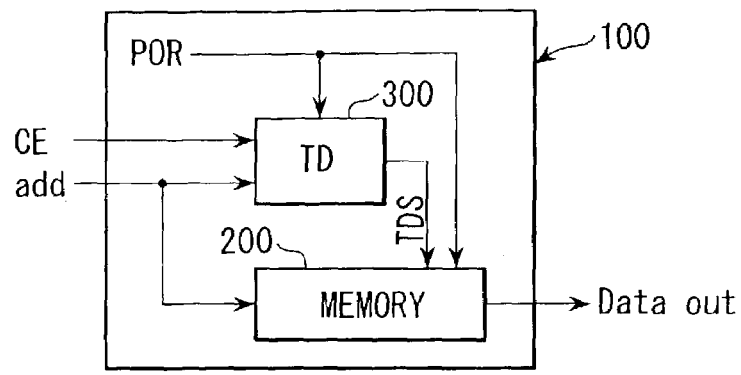
FIG. 1 is a block diagram of a conventional semiconductor device.
Figure 2:
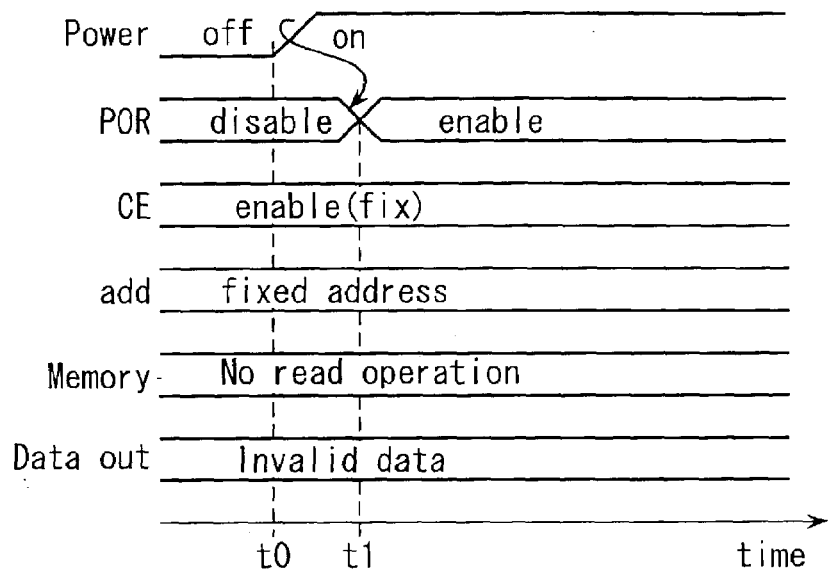
FIG. 2 is a timing chart for various signals in the conventional semiconductor device.
Figure 4A:
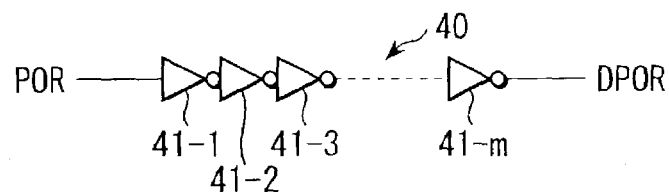
FIG. 4A is a circuit diagram of a delay circuit in the semiconductor device according to the first embodiment of the present invention.

A delay circuit 40 delays the power-on reset signal POR a specified time, which is provided to the logic circuit 50 through the different wire as described above. The "specified time" is the time required to transmit the power-on reset signal POR at least from the internal power supply 30 to the semiconductor storage device 20 and the transition detecting circuit 60. FIG. 4A is a circuit diagram showing an example of a configuration of the delay circuit 40. As shown in the figure, the delay circuit 40 comprises a plurality of inverters 41-1 to 41-m (m is an even number) connected together in series. The power-on reset signal POR delayed by the delay circuit is supplied to the logic circuit 50 as a delayed power-on reset signal DPOR.

The logic circuit 50 performs an AND operation on an externally input chip enable signal CE and the delayed power-on reset signal DPOR. Then, the logic circuit 50 supplies an internal chip enable signal CEint, a result of the operation, to the transition detecting circuit 60.

Figure 4B:
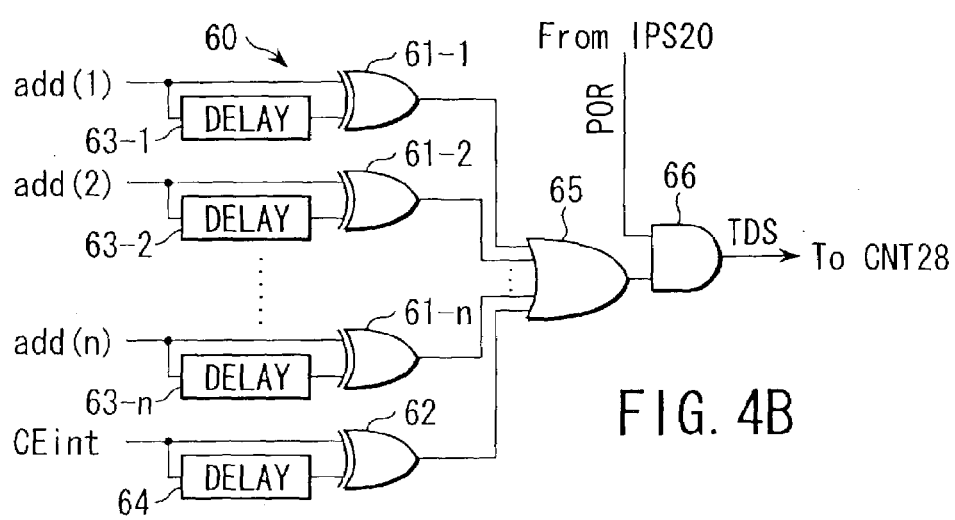
FIG. 4B is a circuit diagram of a transition detecting circuit in the semiconductor device according to the first embodiment of the present invention.

The transition detecting circuit 60 monitors the transition of the address signal add and internal chip enable signal CEint. Upon detecting a transition in at least one of these signals, the transition detecting circuit 60 outputs a transition detection signal TDS. The transition detection signal TDS is an operation start command intended for the semiconductor storage device 20 and supplied to the control circuit 28 of the semiconductor storage device 20. After receiving the power-on reset signal POR (an enabled state), the semiconductor storage device 20 starts operations upon receiving the transition detection signal TDS. That is, the semiconductor storage device 20 does not start operations before a transition occurs in either the address signal add or the internal chip enable signal CEint. FIG. 4B is a circuit diagram showing an example of a configuration of the transition detecting circuit 60.

As shown in this figure, the transition detecting circuit 60 comprises exclusive OR (XOR) gates 61-1 to 61-n (n is an integer) and 62, delay circuits 63-1 to 63-n and 64, an OR gate 65, and an AND gate 66. The XOR gates 61-1 to 61-n correspond to bits add(1) to add(n) of an n-bit address signal. The XOR gates 61-1 to 61-n perform an exclusive OR operation on the respective bits add(1) to add(n) and a signal obtained by using the delay circuits 63-1 to 63-n to delay the bits add(1) to add(n). The XOR gate 62 performs an exclusive OR operation on the internal chip enable signal CEint and a signal obtained by using the delay circuit 64 to delay the internal chip enable signal CEint. The OR gate 65 performs an OR operation on the results of the operations performed by the XOR gates 61-1 to 61-n. The AND gate 66 performs an AND operation on the power-on reset signal and the result of the operation performed by the OR gate 65. Of course, the power-on reset signal POR input to the AND gate 66 is not delayed by the delay circuit 40. Then, the result of the operation performed by the AND gate 66 is output as a transition detection signal TDS. Accordingly, if a transition occurs in at least any bit of the address signal add or in the internal chip enable signal CEint, the output from the corresponding one of the XOR gates 61-1 to 61-n and 62 becomes "1". Thus, the output from the NOR gate 64 becomes "1" to allow the transition in the signal to be detected. In this case, if the power-on reset signal POR is enabled ("1"), the transition detection signal TDS is enabled ("1").

Figure 5:
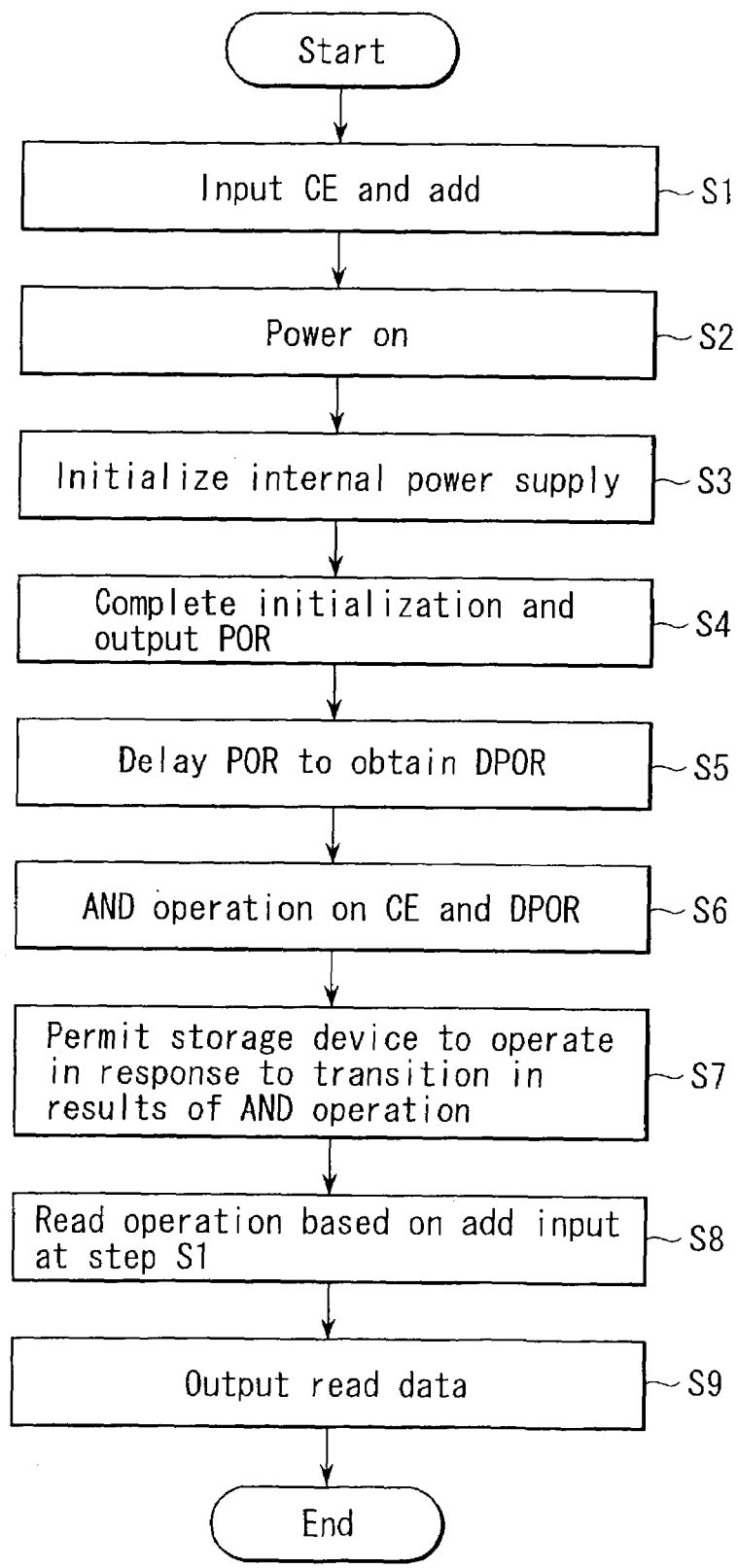
FIG. 5 is a flow chart of a method of activating the semiconductor device according to the first embodiment of the present invention.
Figure 6:
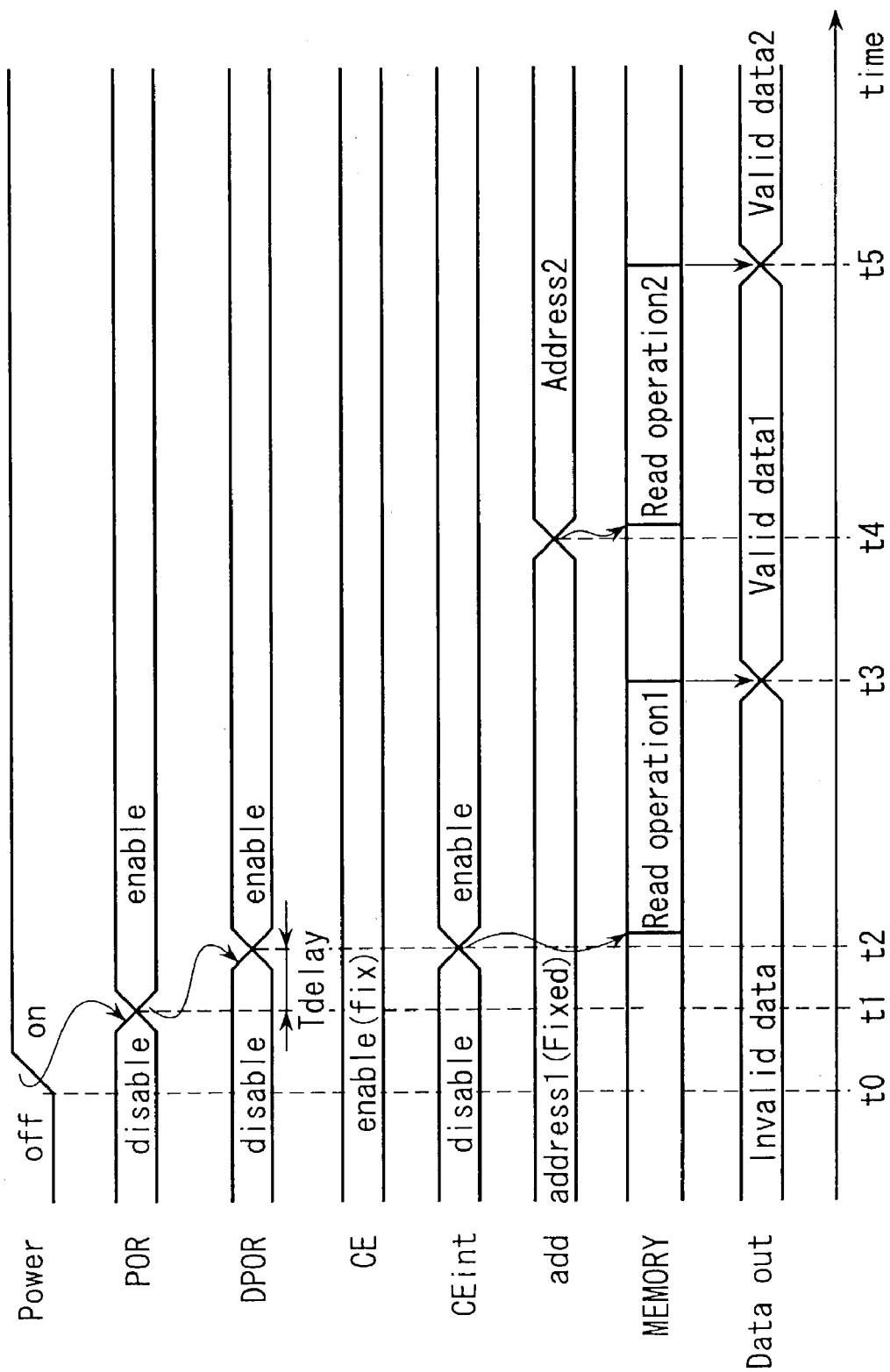
FIG. 6 is a timing chart for various signals in the semiconductor device according to the first embodiment of the present invention.

Now, focusing on the state observed immediately after power-on, description will be given of a read operation performed by the semiconductor storage device according to the present embodiment. FIG. 5 is a flow chart of operations performed by the semiconductor device immediately after power-on. FIG. 6 is a timing chart for various signals.

First, before power-on, a chip enable signal CE and an address signal add are externally input to the semiconductor device 10 (step S1). The address signal add indicates the address of a memory cell in which the data to be read immediately after power-on is recorded.

Then, at a time t0 (see FIG. 6), the semiconductor device 10 is externally powered on (step S2). When the semiconductor device is powered on, the internal power supply 30 is initialized (step S3). Initialization of the internal power supply means that the internal power supply 30 is enabled to supply a stable internal voltage on the basis of an externally provided voltage.

Next, at a time t1, the internal power supply 30 is completely initialized. Then, the internal power supply 30 enables the power-on reset signal POR (step S4). The power-on reset signal POR is supplied to the semiconductor storage device 20 and the transition detecting circuit 60 and is delayed by the delay circuit 40 (step S5). The delay circuit 40 delays the power-on reset signal POR a period Tdelay. As a result, at a time t2, i.e. the period Tdelay after the time t1, the delayed power-on reset signal DPOR is enabled. As described previously, the period Tdelay is required by the power-on reset signal POR to reach the semiconductor storage device 20 and the transition detecting circuit 60. Further, when the power-on reset signal POR is enabled, the semiconductor storage device 20 and the transition detecting circuit 60 are returned from initialization. Returning from initialization of the semiconductor storage device 20 and the transition detecting circuit 60 means that the circuit blocks become active. Accordingly, at the time t2, when the delayed power-on reset signal DPOR is enabled, the semiconductor storage device 20 and the transition detecting circuit 60 have been returned from initialization.

When the delayed power-on reset signal DPOR is enabled, the internal chip enable signal CEint, the result of the AND operation performed on the chip enable signal CE and the delayed power-on reset signal DPOR by the logic circuit 50, is enabled (step S6). FIG. 6 shows that the delayed power-on reset signal DPOR and the internal chip enable signal CEint are enabled at the same time. However, a predetermined time is required to transmit the delayed power-on reset signal DPOR from the delay circuit 40 to the logic circuit 50. Consequently, the internal chip enable signal CEint is enabled a certain time after the delayed power-on reset signal DPOR has been enabled.

Then, the transition detecting circuit 60 detects a transition in the internal chip enable signal CEint to output a transition detection signal TDS (step S7). That is, the transition detecting circuit 60 commands the semiconductor storage device 20 to start operations. Although already described, the transition detecting circuit 60 has already been returned from initialization and is thus active. Then, the power-on reset signal POR is enabled, and the transition detection signal TDS is output. As a result, the semiconductor storage device 20 starts operations.

The semiconductor storage device 20 starts operations and performs a read operation on the basis of the address signal add input at step S1 (step S8). At a time t3, the semiconductor storage device outputs read data to external equipment.

Subsequently, a read operation is performed as required in response to a transition in the address signal add. That is, it is assumed that for example, a new address signal add (address 2) is input at a time t4. Then, the transition detecting circuit 60 detects a transition in the address signal add. Thus, the semiconductor storage device 20 reads data corresponding to the address signal add, and outputs it to the external equipment at a time t5.

The above semiconductor device and its activating method serve to improve the reliability of a read operation performed immediately after power-on. That is, with the configuration and method according to the present embodiment, the delay circuit 40 delays the power-on reset signal POR. Then, the logic circuit 50 performs an AND operation on the chip enable signal CE and the delayed power-on reset signal DPOR output by the delay circuit 40. Upon detecting a transition in either the internal chip enable signal CEint, the result of this AND operation, or the address signal add, the transition detecting circuit 60 commands the semiconductor storage device 20 to start operations. That is, even without a transition in the address signal add or the chip enable signal CE, the transition detection signal TDS is enabled provided that a transition occurs in the power-on reset signal POR. This enables the semiconductor storage device 20 to start operations. Therefore, an operation of reading data from a memory cell can be performed correctly immediately after power-on.

Furthermore, the logic circuit 50 performs an AND operation on the delayed power-on reset signal DPOR and the chip enable signal CE. The delay time for the power-on reset signal DPOR equals the time required by the power-on reset signal POR to reach the transition detecting circuit 60 and the semiconductor storage device 20. In other words, this is the time elapsing from power-on of the semiconductor device 10 until the transition detecting circuit 60 and the semiconductor storage device 20 are completely returned from initialization. Accordingly, when the internal chip enable signal CEint is enabled, the transition detecting circuit 60 and the semiconductor storage device 20 have already been completely returned from initialization. As a result, the transition detecting circuit 60 can accurately detect a transition in the internal chip enable signal CEint to output a transition detection signal TDS. Further, the semiconductor storage device 20 can precisely perform a read operation.

As a result, a semiconductor device and its activation method are provided which serve to improve the reliability of a read operation performed immediately after power-on. The configuration according to the present embodiment allows the direct use of the conventional transition detecting circuit. Thus, the present embodiment can be implemented simply by adding the logic circuit 50 and the delay circuit 40 to the configuration. Therefore, the present embodiment is very simple and convenient.

Figure 7:
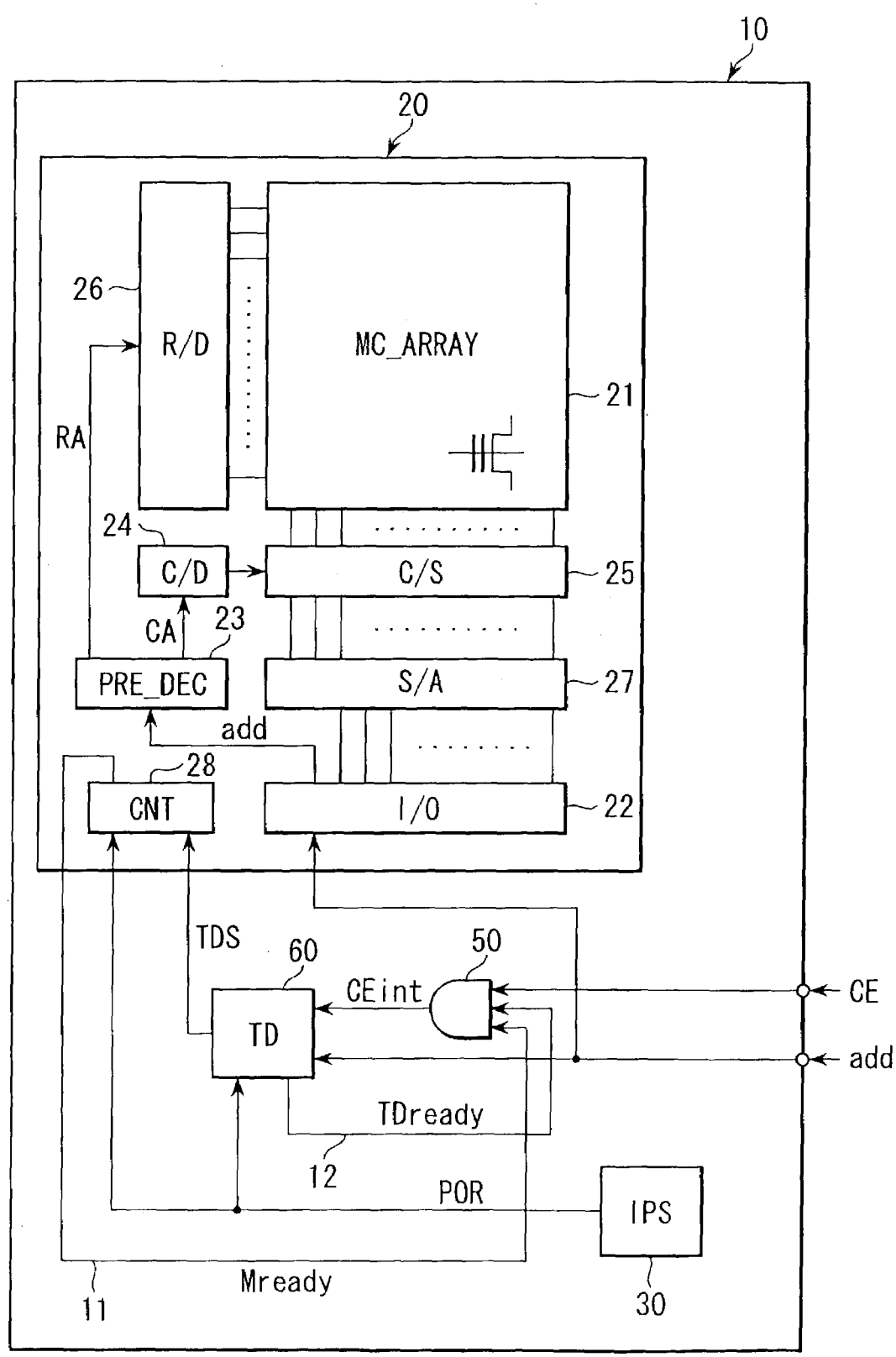
FIG. 7 is a block diagram of a semiconductor device according to a second embodiment of the present invention.

Now, with reference to FIG. 7, a description will be given of a semiconductor device and its activating method according to a second embodiment of the present invention. FIG. 7 is a block diagram showing an example of a configuration of a system LSI including a semiconductor storage device.

As shown in the figure, the LSI 10 comprises the semiconductor storage device 20, the internal power supply 30, the logic circuit 50, and the transition detecting circuit 60.

Figure 8:
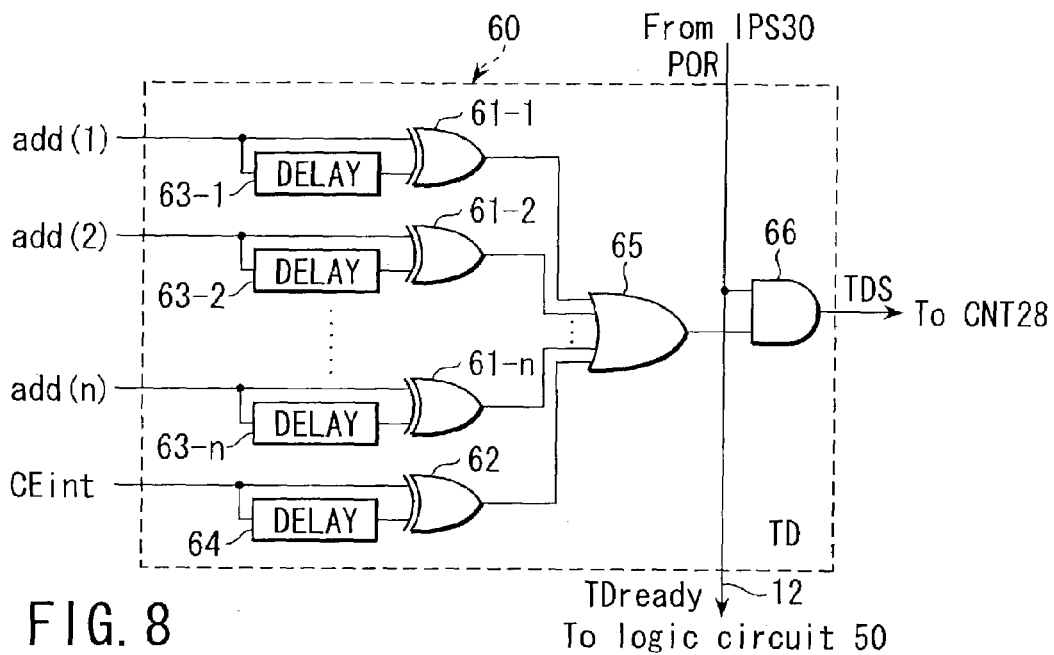
FIG. 8 is a circuit diagram of a transition detecting circuit in the semiconductor device according to the second embodiment of the present invention.

As in the case with the first embodiment, the transition detecting circuit 60 monitors the transition of the address signal add and internal chip enable signal CEint. Upon detecting a transition in at least one of these signals, the transition detecting circuit 60 outputs a transition detection signal TDS. The transition detecting circuit 60 differs from the first embodiment, in that it outputs an initialization completion signal TDready to a signal line 12 when the transition detecting circuit is returned from initialization by an input power-on reset signal POR. FIG. 8 is a circuit diagram showing an example of a configuration of the transition detecting circuit 60 according to the present embodiment.

As shown in the figure, the configuration of the transition detecting circuit 60 is substantially similar to that in the first embodiment, shown in FIG. 4B. However, compared to the first embodiment, a power-on reset signal POR provided by the internal power supply 30 is output to the signal line 12 by the transition detecting circuit 60 as an initialization completion signal TDready. That is, the initialization completion signal TDready corresponds to the power-on reset signal POR that has passed through the transition detecting circuit 60.

The semiconductor storage device 20 has a configuration similar to that in the first embodiment. However, when the semiconductor storage device is returned from initialization by the input power-on reset signal, the semiconductor storage device 20 outputs an initialization completion signal Mready to a signal line 11. As in the case with the transition detecting circuit 60, the initialization completion signal Mready corresponds to the power-on reset signal POR that has passed through the semiconductor storage device 20, notably a control circuit CNT.

The logic circuit 50 performs an AND operation on the chip enable signal CE and the initialization completion signals TDready and Mready. The result of this operation is the internal chip enable signal CEint.

Figure 9:
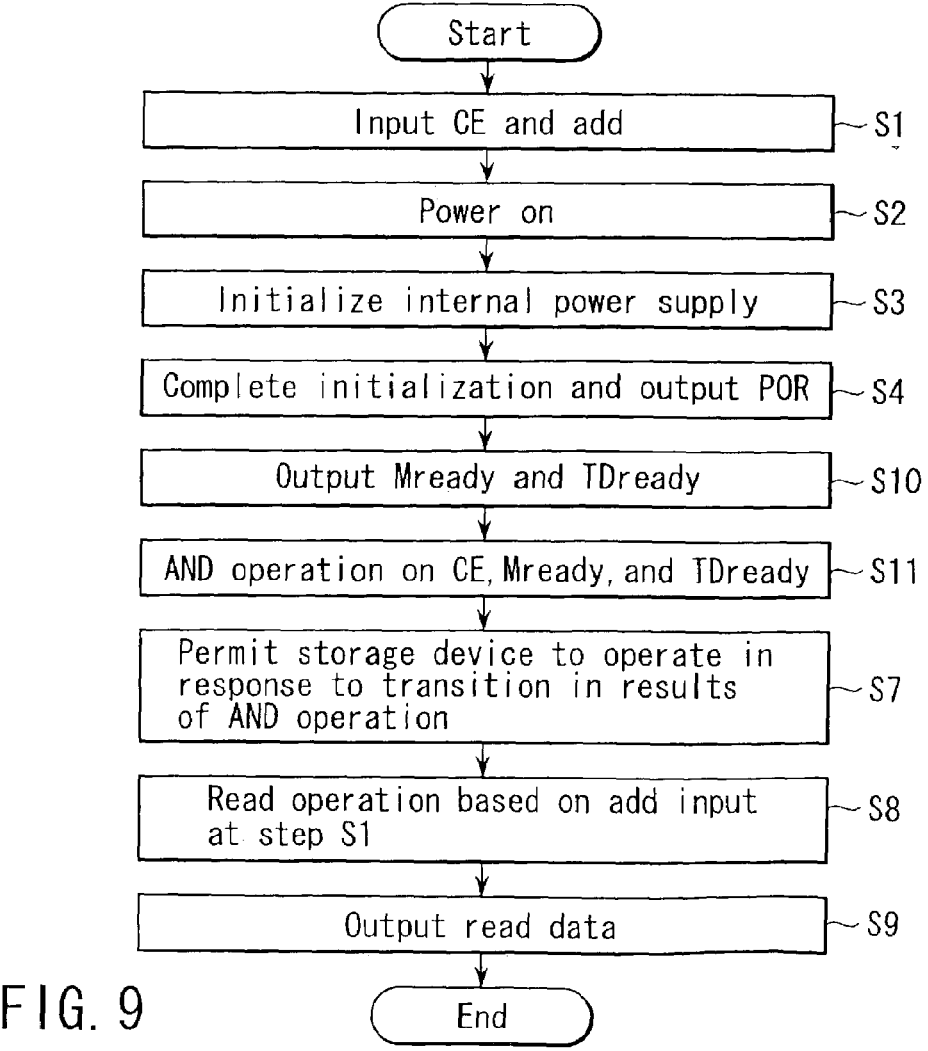
FIG. 9 is a flow chart of a method of activating the semiconductor device according to the second embodiment of the present invention.
Figure 10:
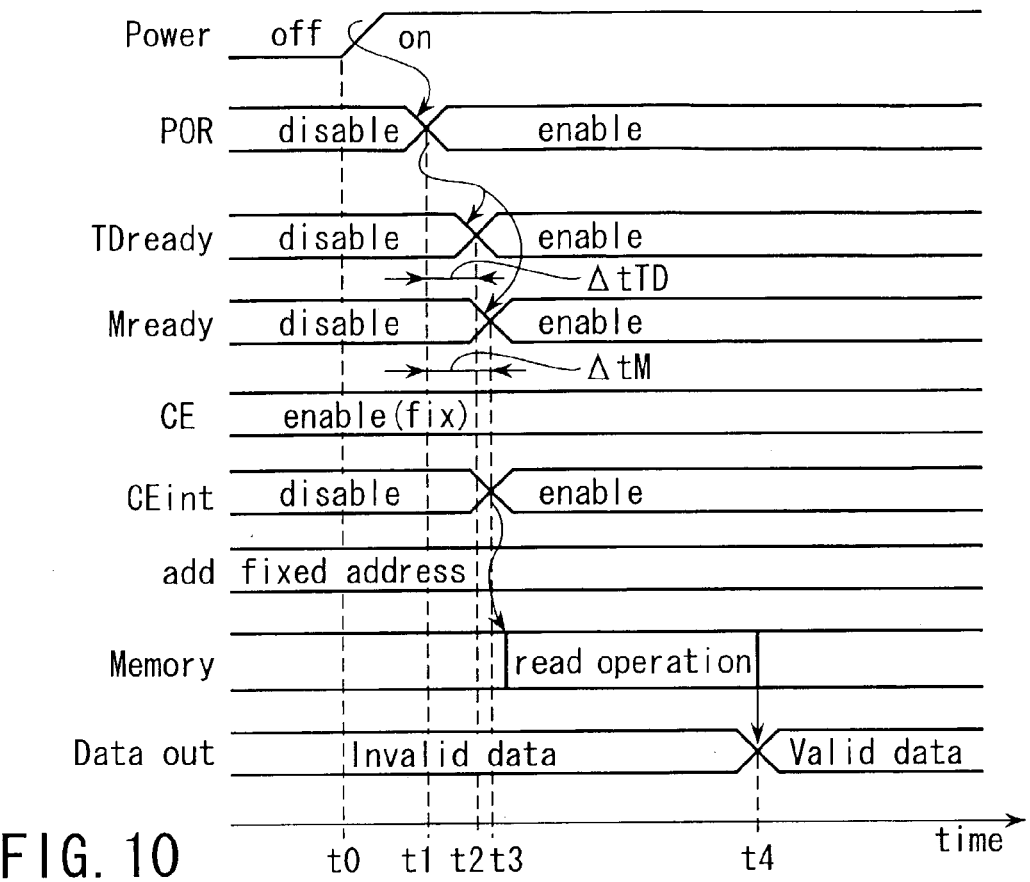
FIG. 10 is a timing chart for various signals in the semiconductor device according to the second embodiment of the present invention.

Now, focusing on the state observed immediately after power-on, description will be given of a read operation performed by the semiconductor storage device according to the present embodiment. FIG. 9 is a flow chart of operations performed by the semiconductor device immediately after power-on. FIG. 10 is a timing chart for various signals.

First, as shown in FIG. 9, the flow from step S1 to step S4 is similar to that in the first embodiment. That is, a chip enable signal CE and an address signal add are input (step S1). Then, at the time t0, the device is powered on (step S2). Then, at the time t1, the internal power supply 30 is completely initialized (step S3). The internal power supply 30 then enables the power-on reset signal POR (step S4).

The enabled power-on reset signal POR is supplied to the semiconductor storage device 20 and the transition detecting circuit 60. Upon receiving the supplied power-on reset signal POR, the semiconductor storage device 20 and the transition detecting circuit 60 are returned from initialization. The transition detecting circuit 60 returned from initialization outputs an initialization completion signal TDready to the signal line 12 at the time t2 (i.e., enables the signal TDready; step S10). Further, the semiconductor storage device 20 outputs an initialization completion signal Mready at the time t3 (i.e., enables the signal Mready). Accordingly, the time interval ΔtTD from time t1 to time t2 and the time interval ΔtM from time t1 to time t3 are generally expressed as follows: ΔtTD is the time required by the power-on reset signal POR to reach the transition detecting circuit 60. ΔtM is the time required by the power-on reset signal POR to reach the semiconductor storage device 20. In other words, ΔtTD is the time required to be returned from initialization from the transition detecting circuit 60. ΔtM is the time required to be returned from initialization for the semiconductor storage device 20.

Then, the logic circuit 50 enables the internal chip enable signal CEint, the result of the operation on the chip enable signal CE and the initialization completion signals Mready and TDready (step S11). As described in the first embodiment, the figure shows that the initialization completion signal Mready and the internal chip enable signal CEint are enabled at the same time. However, a predetermined time is required to transmit the initialization completion signals Mready and TDready from the semiconductor storage device 20 and the transition detecting circuit 60 to the logic circuit 50 via the signal lines 11 and 12. Consequently, the internal chip enable signal CEint is enabled a certain time after the initialization completion signals Mready and TDready have been enabled.

The subsequent steps are similar to steps S7 to S9 described above in the first embodiment. That is, the transition detecting circuit 60 detects a transition in the chip enable signal CEint to output a transition detection signal TDS (step S7). Then, the semiconductor storage device 20 performs a read operation on the basis of the address signal add input at step S1 (step S8). At the time t4, the semiconductor storage device 20 outputs read data to the external equipment. Description of the following operations is omitted.

The above semiconductor device and its activating method serve to improve the reliability of a read operation performed immediately after power-on, as in the case with the first embodiment. That is, with the configuration and method according to the present embodiment, the transition detecting circuit 60 and the semiconductor storage device 20 outputs initialization completion signals TDready and Mready, respectively. The transition detecting circuit 60 and the semiconductor storage device 20 output initialization completion signals TDready and Mready, respectively, upon receiving the power-on reset signal POR. Then, the logic circuit 50 performs an AND operation on the initialization completion signals TDready and Mready and the chip enable signal CE. The transition detecting circuit 60 detects transitions in the internal chip enable signal CEint, the result of this AND operation, and the address signal add to command the semiconductor storage device 20 to start operations. That is, even without a transition in the address signal add or the chip enable signal CE, the transition detection signal TDS is enabled provided that a transition occurs in the power-on reset signal POR. Therefore, an operation of reading data from a memory cell can be performed correctly immediately after power-on.

Furthermore, the transition detecting circuit 60 and the semiconductor storage device 20 outputs initialization completion signals TDready and Mready, respectively, after being returned from initialization. That is, when the internal chip enable signal CEint is enabled, the transition detecting circuit 60 and the semiconductor storage device 20 have already been returned from initialization. As a result, the transition detecting circuit 60 can accurately detect a transition in the internal chip enable signal CEint. Further, the semiconductor storage device 20 can precisely perform a read operation.

As a result, as in the case with the first embodiment, a semiconductor device and its activation method are provided which serve to improve the reliability of a read operation performed immediately after power-on. Further, in the present embodiment, the initialization completion signals TDready and Mready correspond to power-on reset signals POR output to the logic circuit 50 via the transition detecting circuit 60 and the semiconductor storage device 20, respectively. Thus, the present embodiment can be implemented simply by adding the signal lines 11 and 12 and the logic circuit 50 to the configuration. Therefore, the present embodiment is very simple and convenient. In addition, the initialization completion signals TDready and Mready need not be the power-on reset signals POR output to the logic circuit 50 via the transition detecting circuit 60 and the semiconductor storage device 20, respectively. However, these signals are not limited provided that they are output after returning from initialization has been completed.

Figure 11A:
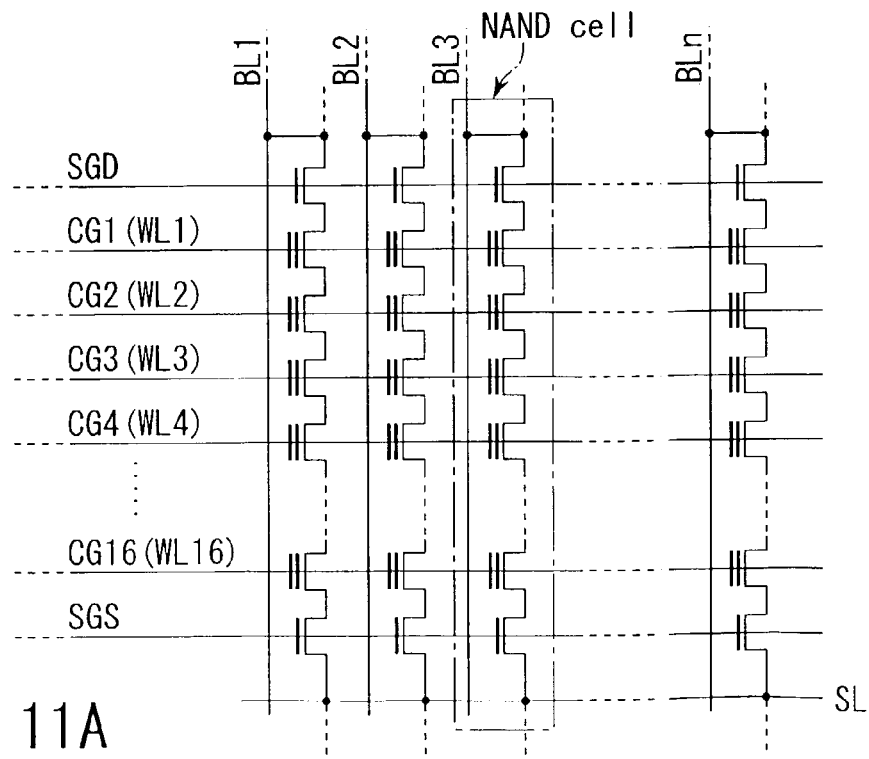
FIG. 11A is a circuit diagram of a memory cell array of a NAND type EEPROM.
Figure 11B:
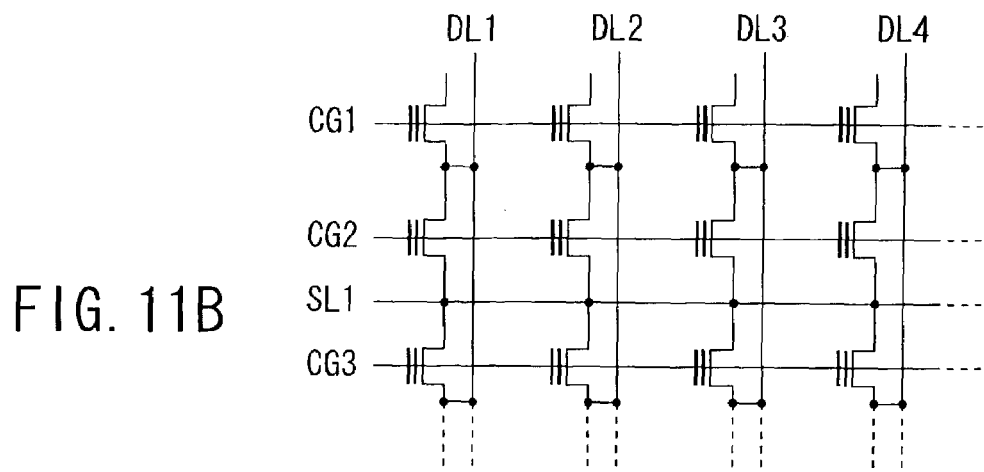
FIG. 11B is a circuit diagram of a memory cell array of a NOR type EEPROM.
Figure 11C:
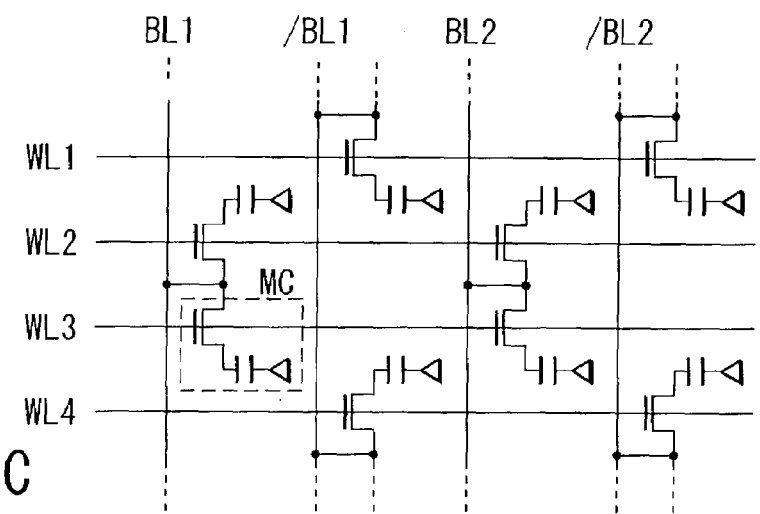
FIG. 11C is a circuit diagram of a memory cell array of a DRAM and a ferroelectric RAM.
Figure 11D:
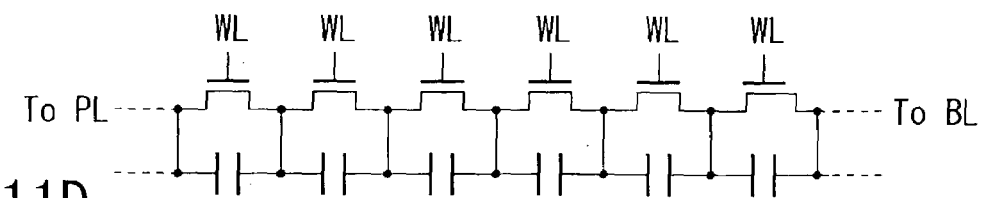
FIG. 11D is a circuit diagram of a memory cell array of a ferroelectric RAM.
Figure 11E:
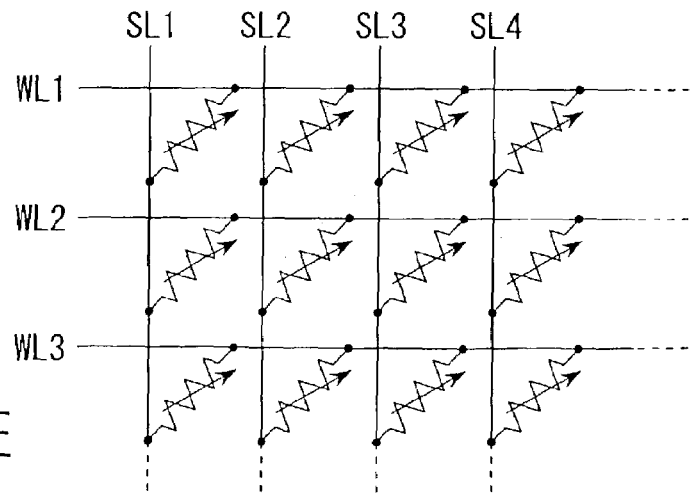
FIG. 11E is a circuit diagram of a memory cell array of an MRAM.

As described above, the semiconductor device and its activating method according to the first or second embodiment of the present invention serve to improve the reliability of a read operation performed immediately after power-on. In the examples described in the above embodiments, the semiconductor device includes a flash memory as the semiconductor storage device 20. The flash memory may be of, for example, a NAND or NOR type as shown in FIGS. 11A or 11B, respectively. FIGS. 11A and 11B are circuit diagrams of memory cell arrays of NAND and NOR type flash memories. Of course, these memories may be of an AND type and are not limited. Needless to say, they are not limited to flash memories. They may be, for example, DRAMs (Dynamic Random Access Memories) as shown in FIG. 11C or ferroelectric random access memories, in which the capacitor insulating films of cell capacitors are replaced with ferroelectric films. FIG. 11C is a circuit diagram of memory cell arrays of a DRAM and a ferroelectric memory. Further, a ferroelectric memory may be a series connected TC unit type ferroelectric RAM, which consists of series connected memory cells each having a transistor having a source terminal and a drain terminal and a ferroelectric capacitor arranged inbetween said two terminals, as shown in FIG. 11D. Further, an MRAM (Magneto-resistive Random Access memory), as shown in FIG. 11E, can be used. These embodiments are applicable to general semiconductor memories.

Figure 12:
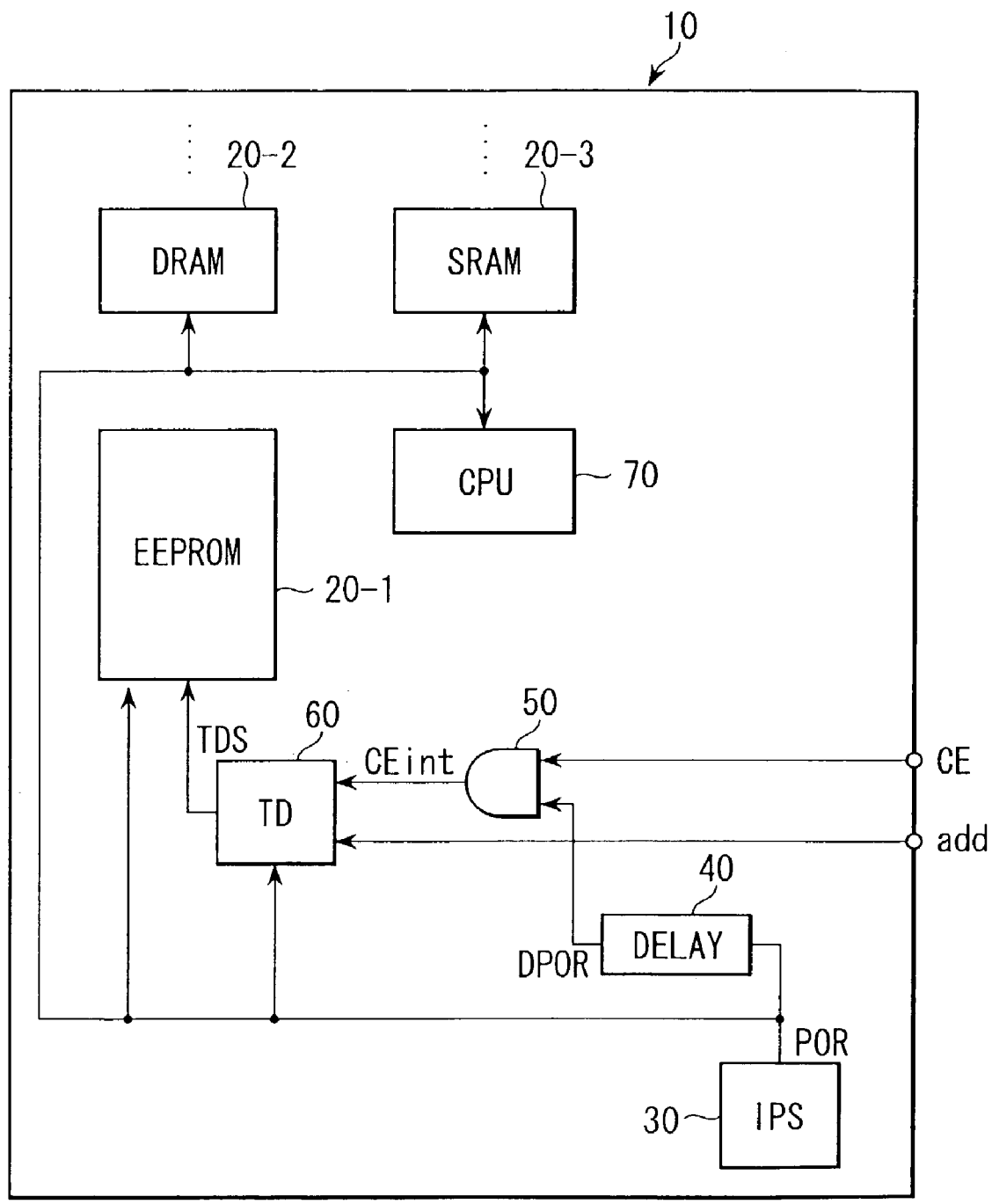
FIG. 12 is a block diagram of a semiconductor device according to a variation of the first embodiment of the present invention.

FIG. 12 is a block diagram of a semiconductor device according to a variation of the first embodiment. In the first embodiment, only the transition detecting circuit 60 and the semiconductor storage device 20 have been described as circuit blocks returned from initialization in response to the power-on reset signal POR. This variation indicates the case in which the device has more circuit blocks.

As shown in the figure, the semiconductor device 10 comprises an EEPROM 20-1, a DRAM 20-2, a SRAM (Static Random Access Memory) 20-3, a CPU 70, the internal power supply 30, the delay circuit 40, the logic circuit 50, and the transition detecting circuit 60. It is assumed that the EEPROM 20-1, the DRAM 20-2, the SRAM 20-3, the CPU 70, and the transition detecting circuit 60 are returned from initialization upon receiving the power-on reset signal. In this case, the delay time Tdelay in the delay circuit 40 corresponds to the time required to be returned from initialization for all of the EEPROM 20-1, the DRAM 20-2, the SRAM 20-3, the CPU 70, and the transition detecting circuit 60. In other words, this is the time required by the power-on reset signal POR to reach the one of the five circuit blocks which is located furthest from the internal power supply 30, i.e., the last circuit block to be reached by the power-on reset signal POR.

Figure 13:
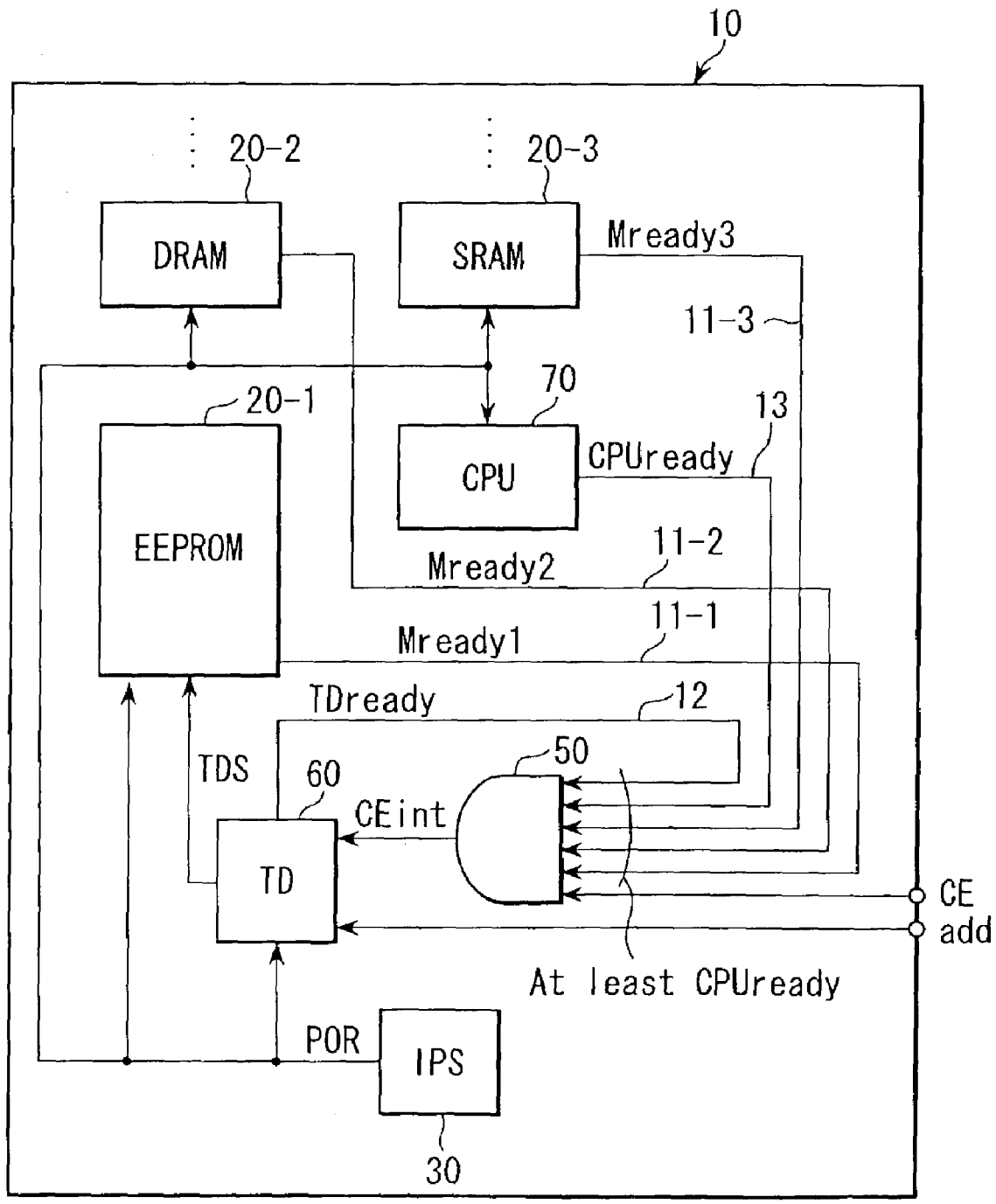
FIG. 13 is a block diagram of a semiconductor device according to a variation of the second embodiment of the present invention.

FIG. 13 is a block diagram of a semiconductor device according to a variation of the second embodiment. As with the variation of the first embodiment, the present variation indicates the case in which the device has more circuit blocks returned from initialization upon receiving the power-on reset signal.

As shown in the figure, the semiconductor device comprises the EEPROM 20-1, the DRAM 20-2, the SRAM 20-3, the CPU 70, the internal power supply 30, the delay circuit 40, the logic circuit 50, and the transition detecting circuit 60. It is assumed that the EEPROM 20-1, the DRAM 20-2, the SRAM 20-3, the CPU 70, and the transition detecting circuit 60 are returned from initialization upon receiving the power-on reset signal. When returned from initialization by the power-on reset signal POR, the EEPROM 20-1, the DRAM 20-2, the SRAM 20-3, the CPU 70, and the transition detecting circuit 60 output initialization completion signals Mready1, Mready2, Mready3, CPUready, and TDready. Then, the logic circuit 50 performs an AND operation on the chip enable signal CE and the initialization completion signals Mready1 to Mready3, TDready, and CPUready. Then, the result of the AND operation performed by the logic circuit 50 becomes an internal chip enable signal CEint.

The second embodiment is also applicable even if the device has a large number of circuit blocks returned from initialization by the power-on reset signal POR as described above. However, not all the circuit blocks needs to output initialization completion signals.

Figure 14:
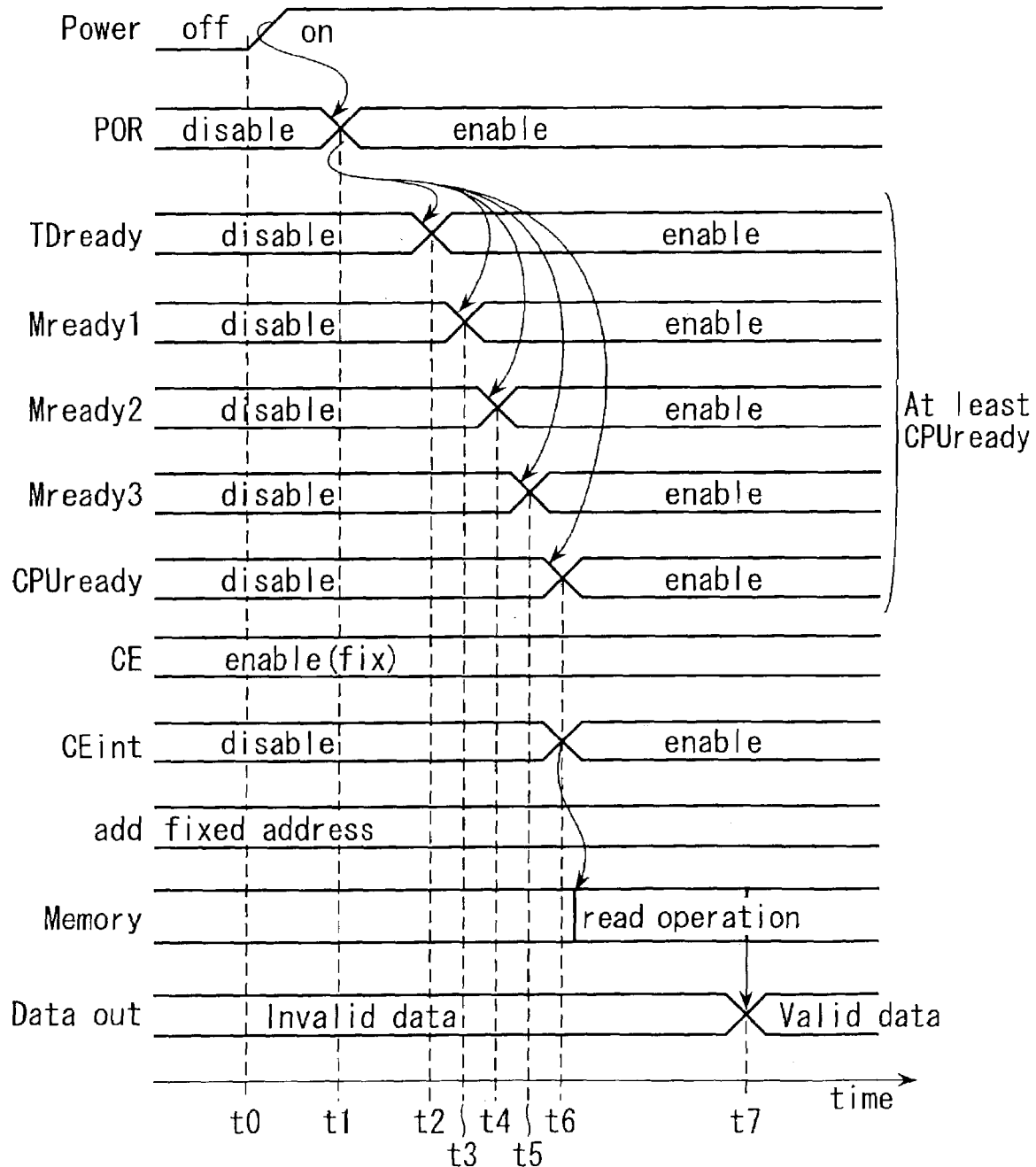
FIG. 14 is a timing chart for various signals in the semiconductor device according to the variation of the second embodiment of the present invention.

FIG. 14 is a timing chart for various signals in the LSI shown in FIG. 13. For example, it is assumed that the time elapsing from power-on till completion of returning from initialization increases in the order of the transition detecting circuit 60, the EEPROM 20-1, the DRAM 20-2, the SRAM 20-3, and the CPU 70. That is, it is assumed the distance from the internal power supply 30 to the circuit block increases in this order. Then, as shown in FIG. 14, the initialization completion signals are enabled in the order of TDready, Mready1 to Mready3, and CPUready. In this case, the logic circuit 50 has only to perform an AND operation on the chip enable signal CE and the initialization completion signal CPU ready. It need not perform any AND operations on the other signals. This is because the initialization completion signal CPUready is enabled last. When the initialization completion signal CPUready is enabled, the EEPROM 20-1, the DRAM 20-2, the SRAM 20-3, and the transition detecting circuit 60 have been returned from initialization.

If the device has a plurality of circuit blocks that output initialization completion signals as described above, the logic circuit 50 has only to perform an AND operation on the last initialization completion signal to be output and the chip enable signal CE. In the present variation, the initialization completion signal CPU ready has been described by way of example. However, for example, if the initialization completion signal Mready1 is output last, the logic circuit 50 has only to perform an AND operation on the initialization completion signal Mready1 and the chip enable signal CE. This is also applicable to the initialization completion signals Mready2, Mready3, and TDready. Of course, only the CPU 70 has to output an initialization completion signal CPUready. The EEPROM 20-1, DRAM 20-2, the SRAM 20-3, and the transition detecting circuit 60 need not necessarily output initialization completion signals Mready1 to Mready3 and TDready. This is also applicable to the second embodiment. In the second embodiment, the logic circuit 50 performs an AND operation on the initialization completion signals TDready and Mready, and the chip enable signal CE. However, it has only to perform an AND operation on the initialization completion signal Mready, output later than the initialization completion signal TDready, and the chip enable signal CE.

Further, in the first and second embodiments and their variations, a LSI comprising the semiconductor storage device has been described by way of example. However, of course, the LSI need not include any semiconductor storage devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
   an internal power supply which outputs an initialization completion signal when the power supply is initialized;
   at least one semiconductor circuit block which operates on the basis of a voltage generated by the internal power supply;
   a delay circuit which delays the initialization completion signal; and
   a detecting circuit which commands the semiconductor circuit block to start operations in response to the initialization completion signal delayed by the delay circuit and an externally input first input signal,
   wherein the detecting circuit comprises a logic circuit which performs a logical operation on the first input signal and the initialization completion signal delayed by the delay circuit, and
   a control circuit which commands the semiconductor circuit block to start operations upon detecting a transition in at least one of the result of the logical operation performed by the logic circuit and an externally input second input signal.

2. The semiconductor device according to claim 1, wherein the internal power supply supplies the initialization completion signal to the semiconductor circuit block and the control circuit, and upon receiving the input initialization completion signal, the semiconductor circuit block and the control circuit become active, and
   wherein after receiving the input initialization completion signal, the semiconductor circuit block starts operation when commanded by the control circuit to start operations.

3. The semiconductor device according to claim 2, wherein the delay circuit delays the initialization completion signal input to the logic circuit for the time required to transmit the initialization completion signal from the internal power supply to at least one of the semiconductor circuit block and the control circuit.

4. The semiconductor device according to claim 2, wherein the delay circuit delays the initialization completion signal for the time required to make the semiconductor circuit block and the control circuit active.

5. The semiconductor device according to claim 2, wherein the delay circuit is a signal wire which transmits the initialization completion signal from the internal power supply to the logic circuit via at least one of the control circuit and the semiconductor circuit block.

6. The semiconductor device according to claim 1, wherein the logic circuit performs a logical AND operation on the initialization completion signal and the first input signal.

7. The semiconductor device according to claim 1, wherein at least one semiconductor circuit block is a non-volatile memory.

8. The semiconductor device according to claim 7, wherein the non-volatile memory is one of a flash memory and a ferroelectric memory.

9. A method of activating a semiconductor device, the method comprising:
   externally inputting first and second input signals to the semiconductor device;
   turning an internal power supply on;
   allowing, when the internal power supply is completely initialized, the internal power supply to output a third input signal to a semiconductor circuit block and a control circuit to make the semiconductor circuit block and the control circuit active, and inputting the third input signal to a delay circuit;
   performing a logical operation on the first input signal and the third input signal delayed by the delay circuit; and
   allowing the control circuit to command the semiconductor circuit block to start operations upon detecting a transition in at least one of the result of the logical calculation and the second input signal,
   wherein after receiving the input third input signal, the semiconductor circuit block starts operation when commanded by the control circuit to start operations.

10. The semiconductor activating method according to claim 9, wherein the delay circuit delays the third input signal by the time period from the output of a third input signal from the internal power supply until at least the semiconductor block and the control circuit become active.

* * * * *

UNITED STATES PATENT AND TRADEMARK OFFICE
CERTIFICATE OF CORRECTION

PATENT NO.       : 7,127,598 B2
APPLICATION NO.  : 10/322587
DATED            : October 24, 2006
INVENTOR(S)      : Kohei Oikawa et al.

It is certified that error appears in the above-identified patent and that said Letters Patent is hereby corrected as shown below:

On the Title Page, Item (56), after "Foreign Patent Documents" please insert the following Japanese Publication No. and date --JP 2000-339969 12/2000--.

Signed and Sealed this

Tenth Day of July, 2007

JON W. DUDAS
*Director of the United States Patent and Trademark Office*